United States Patent [19]
Gretz

[11] Patent Number: 5,765,786
[45] Date of Patent: Jun. 16, 1998

[54] CABLE SUPPORT

[75] Inventor: Thomas J. Gretz, Clarks Summit, Pa.

[73] Assignee: Arlington Industries, Inc., Scranton, Pa.

[21] Appl. No.: 600,700

[22] Filed: Feb. 13, 1996

[51] Int. Cl.[6] .................................................. F16L 3/22
[52] U.S. Cl. .................................... 248/68.1; 248/74.2
[58] Field of Search ......................... 248/68.1, 65, 67.7, 248/74.2

[56] References Cited

U.S. PATENT DOCUMENTS

| 1,356,040 | 10/1920 | Caskey | 248/68.1 |
| 1,542,267 | 6/1925 | Parker | 248/68.1 |
| 4,234,012 | 11/1980 | Schudback | 248/68.1 |
| 5,067,677 | 11/1991 | Miceli | 248/68.1 |
| 5,090,645 | 2/1992 | Zuercher | 248/68.1 |
| 5,209,441 | 5/1993 | Satoh | 248/68.1 |

FOREIGN PATENT DOCUMENTS

| 2439350 | 5/1980 | France | 248/74.2 |

Primary Examiner—Ramon O. Ramirez
Assistant Examiner—Anita M. King

[57] ABSTRACT

The invention consists of a connector for installing stacked cables within a building. The connector is of one piece construction with a foundation section and an integral spine essentially perpendicular to and extending from the foundation. Several limbs extend from each side of the spine and form cable receiving slots. The cable receiving slots may be either a round shape for accommodating round cables or an oval shape for accommodating oval cables. Cable grasping ribs extend into each of the slots. Each of the round limbs will securely hold a round cable that is inserted within a round slot and each of the oval limbs will securely hold an oval cable that is inserted within an oval slot.

13 Claims, 3 Drawing Sheets

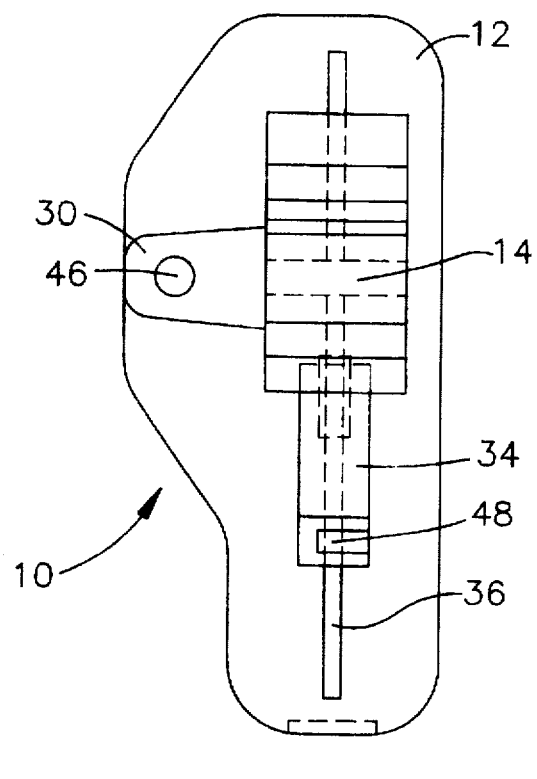
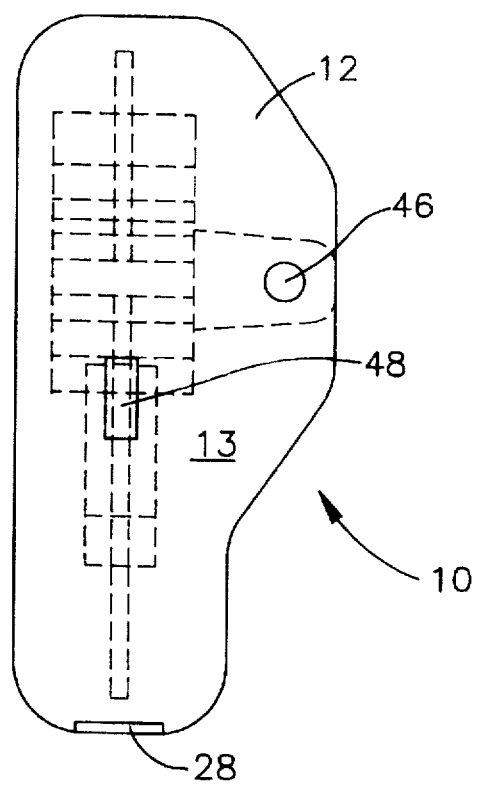
FIG. 4    FIG. 5
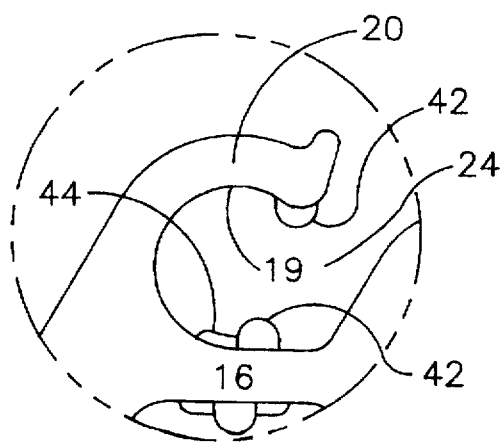
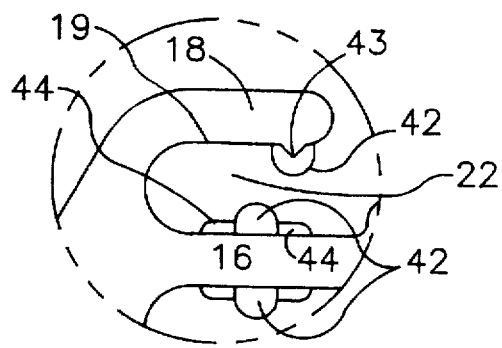
FIG. 6    FIG. 7

CABLE SUPPORT

FIELD OF THE INVENTION

This invention relates to electrical supports, and particularly, to an improved electrical support for attaching multiple cables to the framework of a building. Individual cables should be separated when stacking and also have a minimum distance between the cables and the outer face of an adjacent stud. The connector of this invention also secures each cable individually to prevent the cables from being pulled out of the connector.

BACKGROUND OF THE INVENTION

When installing electrical services in a building, it is frequently necessary to run several cables in the same general direction and in close proximity to one another. There are several supports used in the industry to accomplish what is commonly known as stacking or running the cables in close proximity to one another.

Some of these supports typically have recesses or spaces to guide the individual cables. The connector of this invention provides the proper amount of separation between the cables as specified by the Code.

The current National Electrical Code specifies that the cable closest to the drywall will be no closer than 1.25 inches to prevent the possibility of penetrating the cable with screws, nails, etc. Thus, any suitable support should provide for the spacing.

When stacking cables, another important and desirable feature is for a support to securely hold the installed cables. A pull force applied to the cables should not cause the cables to slip out of the support.

As described by these several limitations, connectors of the present art have not proven fully satisfactory for installing stacked cables in a building.

SUMMARY OF THE INVENTION

This invention consists of a connector for installing stacked cables within a building. The connector is of one piece construction with a foundation section and an integral spine essentially perpendicular to and extending from the foundation. Several limbs extend from each side of the spine and form cable receiving slots. The cable receiving slots may be either a round shape for accommodating round cables or an oval shape for accommodating oval cables. Cable receiving ribs extend into each of the slots from both the limbs and from the integral spine. Each of the round limbs will securely hold a round cable that is inserted within a round slot and each of the oval limbs will securely hold an oval cable that is inserted within an oval slot.

OBJECTS AND ADVANTAGES

One object of the present invention is to provide a connector that will position the cables properly behind the dry wall. The National Electrical Code specifies that the distance from the dry wall to the nearest cable should be no less than 1.25 inches to prevent penetration of the cable by nails, screws, or similar objects. The connector has a tab that overlaps the front edge of the stud and enables the installer to easily position the connector to obtain the required 1.25 inch clearance.

A second object of the present invention is to provide a connector that insures proper separation between adjacent cables as specified for cable stacking by the National Electrical Code. The thickness of the integral spine and the spacing of the limbs along the spine insure proper separation between adjacent cables.

Another object of the present invention is to provide a connector that holds the installed cables so that they will be locked securely in place. Cable grasping ribs extend into the cable receiving slots and provide a means for locking each cables securely in its intended slot.

Other objects and advantages of the preferred embodiment will become apparent when reading the attached description of the invention and referring to the drawings.

DESCRIPTION OF THE DRAWINGS

FIG. 4 an end view of the cable support as viewed from the right side of FIG. 2 toward the foundation.

FIG. 5 is an end view of the cable support as viewed from the left side of FIG. 2 or the side of the foundation that will contact the framing member.

FIG. 6 is a detail view of a round limb and a round slot including the cable grasping ribs.

FIG. 7 is a detail view of an oval limb and an oval slot including the cable grasping ribs.

DESCRIPTION OF THE INVENTION

The invention is a cable support for holding stacked cables in a fixed spatial relationship to a framing member of a building. The cable support positions cables properly with respect to one another as specified by the National Electrical Code. The cable support also provides a device to space the cables no closer than 1.25 inches to the drywall as specified by the National Electrical Code. Cables inserted into the cable support are held securely in place by cable grasping ribs that are located within the cable receiving slots.

Figure 1:
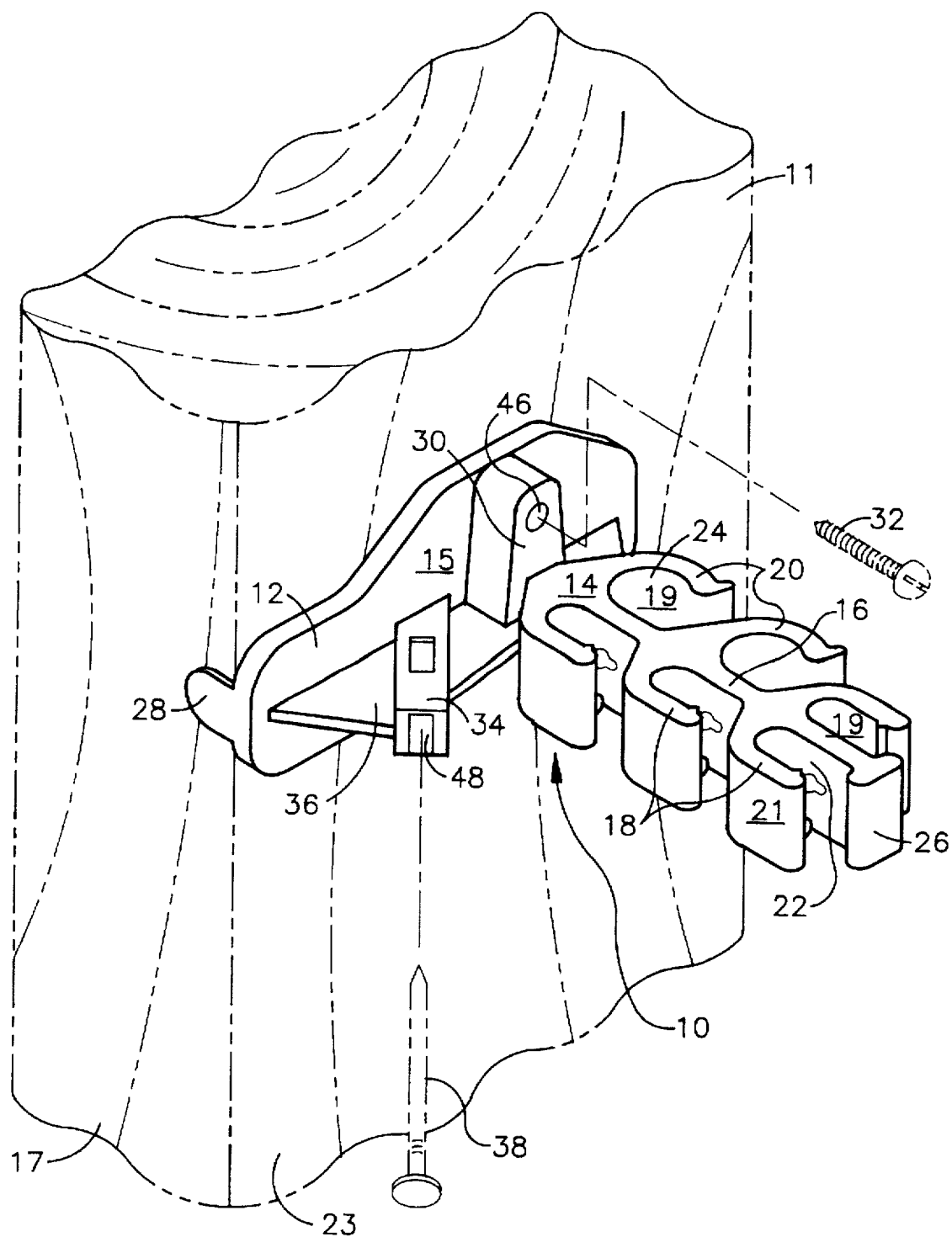
FIG. 1 is a perspective view of a preferred embodiment of the cable support of the present invention positioned on a framing member of a building.

FIG. 1 is a perspective view of a preferred embodiment of the cable support 10 of the present invention positioned on a framing member 11 of a building. The framing member 11 can be oriented vertically or horizontally within the framework of the building. The cable support 10 includes a foundation 12 having a bottom surface (not shown in FIG. 1) that fits flush against the framing member 11. A tab 28 extending downward from one end of the bottom surface of the foundation 12 provides a means of positioning the cables 1.25 inches or other desired distance from the front edge 17 of the framing member as specified by the National Electrical Code.

Extending from the top surface 15 of the foundation 12, as shown in FIG. 1, is the integral spine 14. Also extending from the top surface 15 of the foundation 12 are a boss 30 and a foundation extension 34. The boss 30 contains a screw passageway 46 that will accept a screw 32 for fastening the cable support 10 to a framing member. A sheet metal screw may be employed for attaching the cable support 10 to metal framing members or a wood screw for attaching the cable support 10 to wood framing members. The foundation extension 34 contains a nail passageway 48 which provides a means of attaching the cable support 10 quickly and securely to a wood framing member by use of a nail 38.

Also extending from and integral with the top surface 15 of the foundation 12, as shown in FIG. 1, is a brace 36. The brace 36 extends to and joins the center of the foundation extension 34, joins the opposite side of the foundation extension 34 with the center of the integral spine 14, and joins the opposite side of the integral spine 14 with the foundation 12 at its end opposite the tab 28. The brace 36 supports the foundation extension 34 at its center, the integral spine 14 at its center, and the boss 30 along one side. The integral spine 14 has a trunk section 16 and extensions longitudinally above the foundation 12 from either of its sides. One side of the integral spine 14 has three oval limbs 18 extending longitudinally above the foundation 12. The opposite side of the integral spine 14 has two round limbs 20 and one oval limb 18 extending longitudinally above the foundation 12. Each limb, oval 18 or round 20, has an inner surface 19 and an outer surface 21 and extend substantially parallel to the spine. The inner surface 19 of each oval limb 18 defines an oval cable receiving slot 22. The inner surface 19 of each round limb 20 defines a round cable receiving slot 24.

Figure 2:
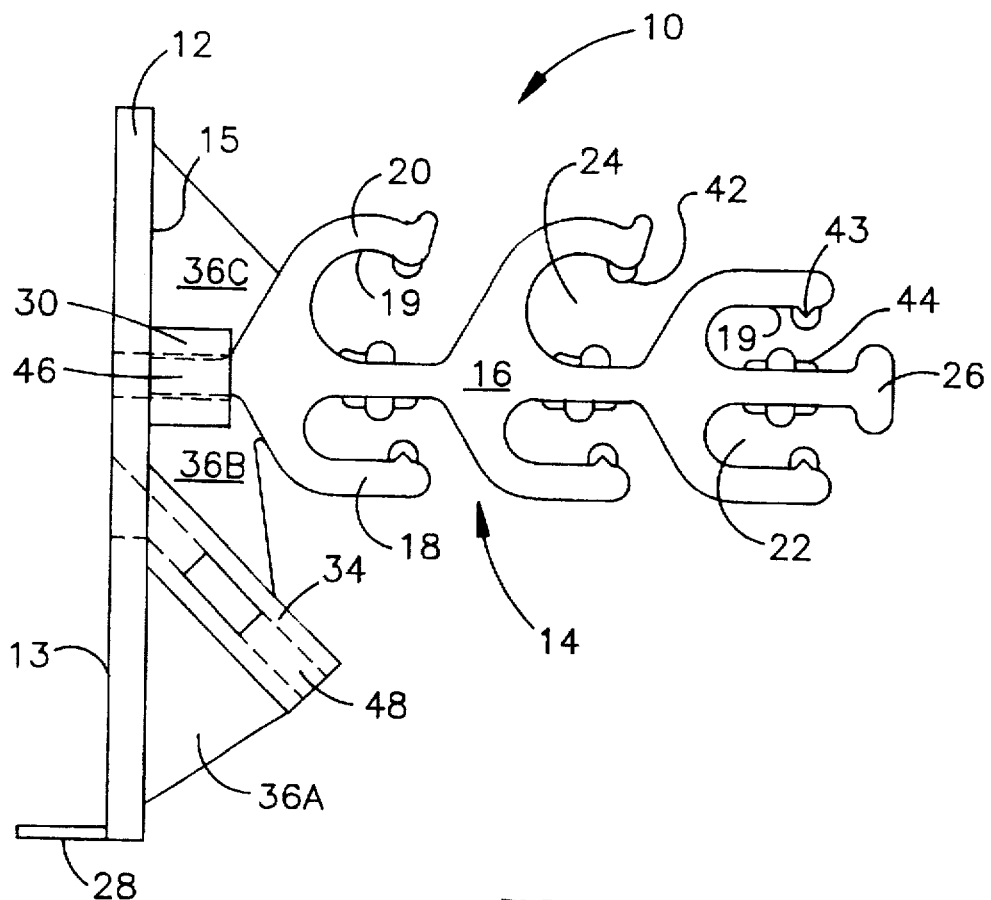
FIG. 2 a top view of the cable support of FIG. 1.

FIG. 2 is a top view of the cable support of FIG. 1 showing the integral spine 14 extending from the top surface 15 of the foundation 12. The bottom surface 13 of the foundation 12 would contact the framing member (not shown) when applied thereto. The brace 36 is shown in one portion 36A joining the top surface 15 of the foundation 12 to one side of the foundation extension 34, in a second portion 36B joining the opposite side of the foundation extension 34 with one side of the integral spine 14, and in a third portion 36C joining the opposite side of the integral spine 14 with the top surface 15 of the foundation 12. As shown in FIG. 2, the foundation extension 34 is angled to allow easy access by an installer to insert and drive a nail through the nail passageway 48. As shown by this top view, the oval limbs 18 form oval cable receiving slots 22 and the round limbs 20 form round cable receiving slots 24. The inner surface 19 of the oval limbs 18 include hemispherical projections 42 and extension ribs 43. The surface of the trunk 16 within the oval slots 22 includes a hemispherical projection 42 and a trunk rib 44 that extends on both sides of the hemispherical projection 42. The extension rib 43 within each oval slot 22 is perpendicular with respect to the trunk rib 44 within that slot. The arrangement and location of each hemispherical projection 42, the extension rib 43, and the trunk rib 44 on opposite sides of the oval slots 22 define cable grasping ribs which securely hold any oval cable of an appropriate size that may be inserted into the oval slot 22. The surface of the trunk 16 within the round slots 24 includes a hemispherical projection 42 and a trunk rib 44 that extends from the hemispherical projection toward the foundation 12 only. The inner surface 19 of the round limbs 20 include hemispherical projections 42. Within the round slots 24, the arrangement and location of each hemispherical projection 42 and the trunk rib 44 on opposite sides of the round slots 24 define cable grasping ribs which securely hold any appropriately sized round cable that may be inserted into the round slot 24.

Figure 3:
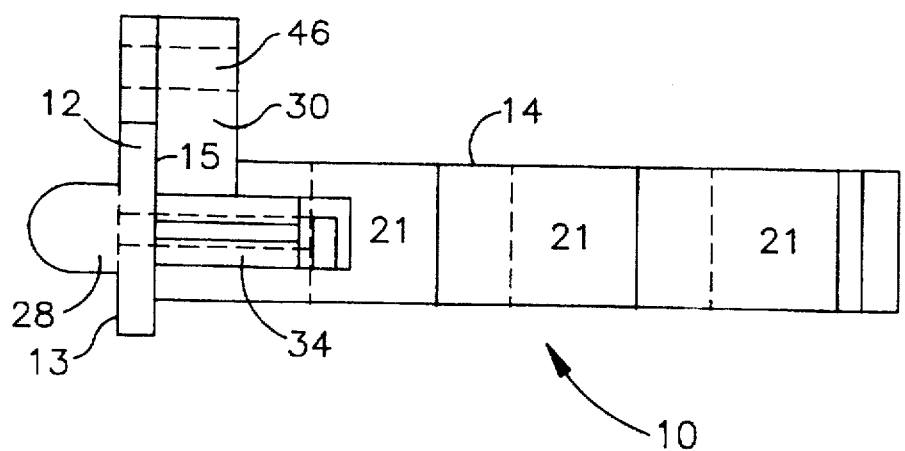
FIG. 3 is a side view of the cable support as viewed from the bottom side of FIG. 2.

FIG. 3 is a side view of the cable support as viewed from the bottom side of FIG. 2 and showing the thin locating tab 28 extending from the bottom surface 13 of the foundation, the integral spine 14 extending from the top surface 15 of the foundation, and the outer surface of each oval limb 18. The boss 30 extends from the top surface 15 of the foundation 12 and includes a screw passageway 46 for receiving a screw for attaching the cable support 10 to a framing member. As shown in FIG. 3, the boss 30 extends well clear of the integral spine 14 in order to provide easy access for an installer to secure a screw through the boss.

FIG. 4 is an end view of the cable support 10 as viewed from the right side of FIG. 2 toward the foundation. The boss 30 and screw passageway 46 are shown at one side of the integral spine 14. The foundation extension 34 and nail passageway 48 are shown extending from another side of the integral spine 14.

FIG. 5 is an end view of the cable support 10 as viewed from the left side of FIG. 2 or the side of the foundation that will contact the framing member. The tab 28 extends from the bottom surface 13 of the foundation 12 at one end of the cable support 10. The screw passageway 46 is shown at the location where it extends through the bottom surface 13 of the foundation 12. The nail passageway 48 is also shown at the location where it extends through the bottom surface 13 of the foundation. The cable support may be shipped with the screw and/or nail pre-assembled in their passageways.

FIG. 6 is a detail view of a round limb 20 and a round slot 24. The surface of the trunk 16 within the round slot 24 includes a hemispherical projection 42 and a trunk rib 44 that extends from the hemispherical projection toward the foundation 12 (not shown). The inner surface 19 of the round limbs 20 include hemispherical projections 42. Within the round slot 24, the arrangement and location of each hemispherical projection 42 and the trunk rib 44 on opposite sides of the round slots 24 define cable grasping ribs which securely hold any appropriately sized round cable that may be inserted into the round slot 24.

FIG. 7 is a detail view of an oval limb 18 and an oval slot 22. The inner surface 19 of the oval limbs 18 include hemispherical projections 42 and extension ribs 43. The surface of the trunk 16 within the oval slots 22 includes a hemispherical projection 42 and a trunk rib 44 that extends on both sides of the hemispherical projection 42. The extension rib 43 within each oval slot 22 is perpendicular with respect to the trunk rib 44 within that slot. The arrangement and location of each hemispherical projection 42, the extension rib 43, and the trunk rib 44 on opposite sides of the oval slots 22 define cable grasping ribs which securely hold any oval cable of an appropriate size that may be inserted into the oval slot 22.

Referring to FIG. 1, to install the cable support 10 of the present invention to a framing member 11, an installer would first place the bottom surface (not shown) of the foundation 12 against the long side 23 of the framing member 11 and slide it until the tab 28 contacts the front edge 17 of the framing member 11. With the tab 28 contacting the front edge 17 of the framing member 11, the installer will be assured that cables later installed in the cable support 10 will be spaced a preferred distance which is usually at least 1.25 inches from the front edge 17 of the framing member 11 as specified by the National Electrical Code. This will provide clearance from penetration by any screws, nails, etc., that may be later installed into the drywall toward the cables.

Once the installer has properly positioned the cable support 10 on the framing member 11 as shown in FIG. 1, he then has the option of securing the cable support 10 to the framing member 11 with either a screw 32 through boss 30 or a nail 38 through foundation extension 34. If the framing member 11 is constructed of wood, the installer would have the option of a wood screw 32 through boss 30 or a nail 38 through foundation extension 34. If the framing member 11 is of metal construction, the installer would use a sheet metal screw 32 through boss 30.

The installer would continue to secure additional cable supports 10 to framing members at proper intervals to form a pathway for the stacked cables. Once a pathway is established by spacing cable supports at proper intervals, the installer would run cables through the supports.

Referring to FIG. 2, the installer would insert round cables (not shown) into round cable receiving slots 24 and insert oval cables (not shown) into oval cable receiving slots 22.

Referring to the round cable receiving slot 24 depicted in FIG. 6, a round cable (not shown) is noninvasively crimped on one side by the hemispherical projection 42 on the inner surface 19 of the round limb 20 and on the other side by the hemispherical projection 42 and trunk rib 44 on the surface of the trunk 16 of the integral spine. Once a round cable is inserted fully into a round cable receiving slot 24, it is very securely held in place and is resistant to any axial force applied along the cable in an attempt to dislodge it. Referring to the oval cable receiving slot 22 depicted in FIG. 7, an oval cable (not shown) is non-invasively crimped near its outer edge by the hemispherical projection 42 on the inner surface 19 of the oval limb 18 and on the other side by the hemispherical projection 42 and trunk ribs 44 on the surface of the trunk 16 of the integral spine. Once an oval cable is inserted fully into an oval cable receiving slot 22, it is very securely held in place and is resistant to any axial force applied along the cable in an attempt to dislodge it. The cable support 10 must resist axial forces along the cables as these are typically encountered when running cable from one cable support to another to run wiring through a building.

Referring to FIG. 2, the integral spine 14 includes a T-shaped top 26. Starting from the foundation 12 and proceeding along the integral spine 14, the first two cable receiving slots located on either side of the spine have the entrances to their cable receiving slots restricted by the limb ahead of it. The T-shaped top 26 serves to restrict the opening to the two oval cable receiving slots 22 located farthest out on the integral spine 14 and helps keep the oval cables (not shown) from sliding out of those slots. The entrance to the slots are defined by the free end of the limbs and the bottom of the next limb or the T-shaped top. These entrances define a tortuous path before the cables are seated and the limbs spring slightly outward to accommodate the thickness of the cables.

The preferred material of construction of the cable support of this invention is polypropylene. It could also be constructed of any similar flexible plastic material that met all the requirements of the National Electrical Code.

The cable support of the present invention allows easy bends in the cables when running cables from a cable support located on a horizontal framing member to an adjacent cable support located on a vertical framing member.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A cable support for maintaining proper spacing between a plurality of electrical cables for holding the cables securely to the framework of a building comprising;

an elongated foundation having a top surface and a bottom surface;

an integral spine essentially perpendicular to and extending from said top surface of said foundation;

a plurality of extensions extending from each side of said spine, said extensions extending longitudinally above said foundation and generally parallel to said spine, said extensions having a bottom, a free end, an outer surface and an inner surface with said inner surfaces of said extensions defining cable receiving slots;

a tortuous entrance to said cable receiving slots defined by said free ends of said extensions and the bottom of the next extension;

an attachment member integral with and extending from said top surface of said foundation containing a fastener receiving passageway for assistance in the attachment of said cable to a framing member; and a brace extending from said top surface of said foundation, said brace integral with and supporting said attachment member and said brace integral with and supporting said integral spine at its juncture with said top surface of said foundation.

2. The cable support of claim 1 wherein said cable receiving slots are adapted to hold electrical cables in a fixed position with respect to each other to maintain a desired separation between cables.

3. The cable support of claim 1 wherein one end of said bottom surface of said foundation further includes a tab extending from one end of said bottom surface to aid in positioning cables a fixed distance from the edge of framing members.

4. The cable support of claim 1 wherein said cable receiving slots include cable grasping ribs which are adapted to tightly hold any electrical cables of the proper size that are inserted within them.

5. The cable support of claim 1 wherein said cable receiving slots may be either round receiving slots having a round shape for accommodating round cables or oval receiving slots having an oval shape for accommodating oval cables.

6. The cable support of claim 5 wherein said cable receiving slots include cable grasping ribs extending into said cable receiving slots, said cable grasping ribs including a hemispherical rib extending from said inner surface of said extensions, and said cable grasping ribs further including a hemispherical rib extending from said integral spine.

7. The cable support of claim 5 wherein said cable receiving slots include cable grasping ribs extending into said cable receiving slots, said cable grasping ribs including a hemispherical rib extending from said inner surface of said extensions and an elongated rib base extending from said spine that includes a hemispherical rib on top said elongated rib base.

8. The cable support of claim 1, said brace integral with and supporting said integral spine at its juncture with said top surface of said foundation, wherein said brace is integral with and supporting said extensions that are located adjacent said top surface of said foundation.

9. The cable support of claim 1 wherein said support is formed of polypropylene.

10. The cable support of claim 1 wherein said support is formed of a flexible plastic material.

11. The cable support of claim 1 wherein said cable receiving slots each include an entrance defined by said free end of said extensions and the bottom of the next extension on said integral spine, said entrance defining a tortuous path before a cable is seated with said extensions including a spring action causing said free end to spring slightly outward to accommodate the thickness of a cable.

12. The cable support of claim 1 which includes cable grasping ribs extending into said cable receiving slots, said cable grasping ribs including a hemispherical rib extending from said inner surface of said extensions, said ribs further including an elongated rib base that includes a hemispherical rib on top of said elongated rib base.

13. A cable support for maintaining proper spacing between a plurality of electrical cables for holding the cables securely to the framework of a building comprising:

an elongated foundation having a top surface and a bottom surface;

an integral spine essentially perpendicular to and extending from said top surface of said foundation;

a plurality of extensions extending from each side of said spine, said extensions extending longitudinally above said foundation and generally parallel to said spine; said extensions having a bottom, a free end, an outer surface and an inner surface with said inner surfaces of said extensions defining cable receiving slots;

a tortuous entrance to said cable receiving slots defined by said free ends of said extensions and the bottom of the next extension;

an integral T-shaped top which restricts the opening between said extensions that are farthest from said foundation and adapted to hold cables firmly in place on the topmost of said cable receiving slots; and an attachment member integral with and extending from said top surface of said foundation containing a fastener receiving passageway for assistance in the attachment of said cable to a framing member.

* * * * *